United States Patent
Rayssiguier et al.

(10) Patent No.: US 8,570,832 B2
(45) Date of Patent: Oct. 29, 2013

(54) VARIABLE THROAT VENTURI FLOW METER HAVING A PLURALITY OF SECTION-VARYING ELEMENTS

(75) Inventors: Christophe Rayssiguier, Melun (FR); Laurent Alteirac, Borgen (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 604 days.

(21) Appl. No.: 12/644,049

(22) Filed: Dec. 22, 2009

(65) Prior Publication Data

US 2010/0165788 A1 Jul. 1, 2010

Related U.S. Application Data (60) Provisional application No. 61/141,734, filed on Dec. 31, 2008.

(51) Int. Cl.
*E21B 47/16* (2006.01)
*G10K 11/00* (2006.01)
*B06B 1/00* (2006.01)

(52) U.S. Cl.
USPC ........... 367/82; 367/173; 367/176; 340/854.4

(58) Field of Classification Search
USPC ............... 367/81, 82, 162, 165, 173, 176; 340/854.4
See application file for complete search history.

(56) References Cited

U.S. PATENT DOCUMENTS

| | | | | |
|---|---|---|---|---|
| 3,992,694 A | * | 11/1976 | Ehrlich | 367/158 |
| 4,129,850 A | * | 12/1978 | Mumper | 367/158 |
| 4,282,588 A | * | 8/1981 | Chanson et al. | 367/82 |
| 5,469,736 A | | 11/1995 | Moake | |
| 5,796,677 A | | 8/1998 | Kostek et al. | |
| 5,852,587 A | | 12/1998 | Kostek et al. | |
| 5,886,303 A | | 3/1999 | Rodney | |
| 6,084,826 A | | 7/2000 | Leggett, III | |
| 6,137,747 A | | 10/2000 | Shah et al. | |
| 6,466,513 B1 | | 10/2002 | Pabon et al. | |
| 7,301,472 B2 | | 11/2007 | Kyle et al. | |
| 7,301,473 B2 | | 11/2007 | Shah et al. | |
| 7,339,494 B2 | | 3/2008 | Shah et al. | |
| 7,460,435 B2 | | 12/2008 | Garcia-Osuna et al. | |
| 7,595,737 B2 | | 9/2009 | Fink et al. | |
| 7,777,645 B2 | | 8/2010 | Shah et al. | |
| 2009/0038848 A1 | * | 2/2009 | Garcia-Osuna | 175/40 |

* cited by examiner

*Primary Examiner* — Ian Lobo
(74) *Attorney, Agent, or Firm* — Cameron R. Sneddon (57) ABSTRACT

An acoustic transceiver assembly including a housing, an oscillator, and a blocking element. The housing has at least one inner wall defining a cavity. The cavity has a first end and a second end defining an axis of said acoustic transceiver assembly. The oscillator is provided in said cavity. The oscillator is provided with a transducer element, and a backing mass positioned adjacent to the transducer element. A blocking element is positioned inside the cavity and adjacent to the oscillator. The blocking element is adapted to restrain a portion of said backing mass at a first pressure to thereby restrain the backing mass from lateral movement relative to the axis of the acoustic transceiver assembly. The blocking element is also adapted to release the backing mass at a second pressure.

21 Claims, 4 Drawing Sheets

VARIABLE THROAT VENTURI FLOW METER HAVING A PLURALITY OF SECTION-VARYING ELEMENTS

CROSS-REFERENCE TO RELATED APPLICATIONS

This application claims priority to U.S. Provisional application No. 61/141,734, filed Dec. 31, 2008, the entire contents of which are herein incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE §1.52(E)(5))

Not Applicable.

TECHNICAL FIELD

This invention relates generally to telemetry systems and acoustic sensors for use with installations in oil and gas wells or the like. More particularly, but not by way of limitation, the present invention relates to an acoustic transceiver assembly for transmitting and receiving data and control signals between a location down a borehole and the surface, or between downhole locations themselves.

BACKGROUND

One of the more difficult problems associated with any borehole is to communicate measured data between one or more locations down a borehole and the surface, or between downhole locations themselves. For example, in the oil and gas industry it is desirable to communicate data generated downhole to the surface during operations such as drilling, perforating, fracturing, and drill stem or well testing; and during production operations such as reservoir evaluation testing, pressure and temperature monitoring. Communication is also desired to transmit intelligence from the surface to downhole tools or instruments to effect, control or modify operations or parameters.

Accurate and reliable downhole communication is particularly important when complex data comprising a set of measurements or instructions is to be communicated, i.e., when more than a single measurement or a simple trigger signal has to be communicated. For the transmission of complex data it is often desirable to communicate encoded analog or digital signals.

One approach which has been widely considered for borehole communication is to use a direct wire connection between the surface and the downhole location(s). Communication then can be made via electrical signal through the wire. While much effort has been spent on "wireline" communication, its inherent high telemetry rate is not always needed and its deployment can pose problems for some downhole operations.

Wireless communication systems have also been developed for purposes of communicating data between a downhole tool and the surface of the well. These techniques include, for example, communicating commands downhole via (1) electromagnetic waves; (2) pressure or fluid pulses; and (3) acoustic communication. Each of these arrangements are highly susceptible to damage due to the harsh environment of oilfield technology in terms of shocks, loads, temperature, pressures, environmental noise and chemical exposure. As such, there is a need in the oil and gas industry to provide protected and reliable wireless communication systems for transmitting data and control signals between a location down a borehole and the surface, or between downhole locations themselves.

In general, a basic element of the conventional acoustic telemetry system includes one or more acoustic transceiver element, such as piezoelectric element(s), magnetostrictive element(s) or combinations thereof which convert energy between electric and acoustic forms, and can be adapted to act as a source or a sensor. In general, one acoustic transceiver element can be made of one or more piezoelectric elements or magnetostrictive element. With respect to the acoustic transceiver element being made from a stack of piezoelectric elements, such elements are made of brittle, ceramic material, thereby requiring protection from transport and operational shocks. Conventional sonic sources and sensors used in downhole tools are described in U.S. Pat. Nos. 6,466,513, 5,852,587, 5,886,303, 5,796,677, 5,469,736 and 6,084,826, 6,137,747, 6,466,513, 7,339,494, and 7,460,435.

In particular, U.S. Pat. No. 7,339,494 teaches an acoustic telemetry transceiver having a piezoelectric transducer for generating an acoustic signal that is to modulate along a mandrel. The prior art is described as providing an acoustic telemetry transceiver that approximately removes lateral movement (relative to the axis of the drill string), and as being configured to be stable over a wide range of operating temperatures and to withstand large shock and vibrations. Embodiments for achieving such objectives teach an acoustic telemetry transceiver having a backing mass that is housed in a linear/journal bearing, and/or a piezoelectric stack coupled to a tapered conical section of the mandrel of the drill string wherein contact is increased therebetween based on a pressure of a flow of a fluid between the piezoelectric stack and the mandrel.

While the present invention and the prior art taught by U.S. Pat. No. 7,339,494 may be considered to share common objectives of protecting the piezoelectric elements of an acoustic transceiver, the exemplary implementations of the present invention, which will be subsequently described in greater detail, for carrying out such objectives include many novel features that result in a new acoustic transceiver assembly and method which is not anticipated, rendered obvious, suggested, or even implied by any of the prior art devices or methods, either alone or in any combination thereof.

Despite the efforts of the prior art, there exists a need for an acoustic transceiver assembly adapted to withstand the heavy shocks and vibrations often associated with the transportation and operation of a downhole tubing string. It is therefore desirable to provide an improved acoustic transceiver assembly with integrated protective features without sacrificing performance and sensitivity.

SUMMARY OF THE DISCLOSURE

In one aspect, the present invention is directed to an acoustic transceiver assembly including a housing, an oscillator, and a blocking element. The housing has at least one inner wall defining a cavity. The cavity has a first end and a second end defining an axis of the acoustic transceiver assembly.

The oscillator is provided in the cavity. The oscillator preferably includes a transducer element, and a backing mass. The transducer element is positioned at the first end of the cavity, and the backing mass is positioned adjacent the transducer element. The transducer element is preferably disposed between the backing mass and the first end of the cavity.

The blocking element is positioned adjacent the oscillator in the cavity. The blocking element is adapted to restrain a portion of the backing mass from lateral movement relative to the axis of the acoustic transceiver assembly, and to permit oscillations of the backing mass.

In one aspect, the blocking element restrains the backing mass at a first pressure and releases the backing mass at a second pressure to permit oscillations of the backing mass. The second pressure may be higher than the first pressure. Moreover, the first pressure may be atmospheric pressure, and the second pressure may be hydrostatic pressure.

In a further aspect, the acoustic transceiver assembly further includes at least one blocking spring biased against the blocking element, and an equalizing chamber having a port hole open to receiving the first pressure and/or the second pressure.

In an even further aspect, the acoustic transceiver assembly may include at least one seal for sealing off the equalizing chamber.

In another aspect, the oscillator of the acoustic transceiver assembly may further include at least one preloading spring having a first end coupled to the backing mass and a second end coupled to the first end of the cavity.

In yet another aspect, the present invention is directed to a downhole tool including a sensor for monitoring a downhole parameter, an acoustic transceiver assembly as described hereinbefore in communication with the sensor, and a blocking element.

In one aspect, the blocking element is positioned adjacent the oscillator in the cavity. The blocking element is therefore adapted to restrain a portion of the backing mass from lateral movement relative to the axis of the acoustic transceiver assembly, and to permit oscillations of the backing mass.

In another aspect, the blocking element restrains the backing mass at a first pressure and releases the backing mass at a second pressure to permit oscillations of the backing mass. The second pressure may be higher than the first pressure. Moreover, the first pressure may be atmospheric pressure, and the second pressure may be hydrostatic pressure.

In a further aspect, the present invention is directed to an acoustic transceiver assembly including a housing, an oscillator, and a blocking element. The housing has at least one inner wall defining a cavity. The cavity has a first end and a second end defining an axis of the acoustic transceiver assembly.

The oscillator is provided in the cavity. The oscillator preferably includes a piezoelectric element, and a backing mass. The piezoelectric element is positioned at the first end of the cavity, and the backing mass is positioned adjacent the piezoelectric element. The piezoelectric element is preferably disposed between the backing mass and the first end of the cavity.

The blocking element is positioned adjacent the oscillator in the cavity. The blocking element is adapted to restrain a portion of the backing mass from lateral movement relative to the axis of the acoustic transceiver assembly, and to permit oscillations of the backing mass.

In one aspect, the blocking element restrains the backing mass at a first pressure and releases the backing mass at a second pressure to permit oscillations of the backing mass. The second pressure may be higher than the first pressure. Moreover, the first pressure may be atmospheric pressure, and the second pressure may be hydrostatic pressure.

In another aspect, the acoustic transceiver assembly further includes at least one blocking spring biased against the blocking element, and an equalizing chamber having a port hole open to receiving the first pressure and/or the second pressure.

In yet another aspect, the acoustic transceiver assembly may include at least one seal for sealing off the equalizing chamber.

In another aspect, the oscillator of the acoustic transceiver assembly may further include at least one preloading spring having a first end coupled to the backing mass and a second end coupled to the first end of the cavity.

In a further aspect, the present invention is directed to a method for making an acoustic transceiver assembly for introducing acoustic signals into an elastic media positioned in a well bore. The method includes the steps of: forming an oscillator, and suspending the oscillator in a housing.

The step of forming the oscillator may be performed by acoustically coupling a backing mass to a transducer element. And the step of suspending the oscillator in a housing may be performed by positioning a blocking element adjacent to the backing mass, wherein the blocking element restrains the backing mass at a first pressure and releases the backing mass at a second pressure.

In an even further aspect, the method may include the steps of: forming an equalizing chamber between the blocking element and the housing; and forming at least one port hole in the equalizing chamber and through the housing. Moreover, the at least one port hole can be adapted to receive the first and/or second pressures.

In another aspect, the method may further include the step of forming at least one seal for sealing off the equalizing chamber.

In one aspect, the blocking element may be conical.

In another aspect, the present invention is directed to a method for making a downhole modem. The method preferably includes the steps of: forming an oscillator by acoustically coupling a backing mass to a transducer element, and suspending the oscillator in a housing with a blocking element. The blocking element is preferably positioned adjacent to the backing mass, wherein the blocking element restrains the backing mass at a first pressure and releases the backing mass at a second pressure.

The method may further include the step of connecting the transducer element to control electronics suitable for causing the oscillator to transmit acoustic signals into an elastic media and receive acoustic signals from the elastic media to form the downhole modem.

These, together with other aspects, features, and advantages of the present invention, along with the various features of novelty, which characterize the present invention, are pointed out with particularity in the claims annexed to and forming a part of this disclosure. The above aspects and advantages are neither exhaustive nor individually or jointly critical to the spirit or practice of the present invention. Other aspects, features, and advantages of the present invention will become readily apparent to those skilled in the art from the following detailed description in combination with the accompanying drawings, illustrating, by way of example, the principles of the present invention. Accordingly, the drawings and description are to be regarded as illustrative in nature, and not restrictive.

BRIEF DESCRIPTION OF THE SEVERAL VIEWS OF THE DRAWINGS

Implementations of the present invention may be better understood when consideration is given to the following detailed description thereof. Such description makes reference to the annexed pictorial illustrations, schematics, graphs, drawings, and appendices. In the drawings.

DETAILED DESCRIPTION

Numerous applications of the present invention are described, and in the following description, numerous specific details are set forth. However, it is understood that implementations of the present invention may be practiced without these specific details. Furthermore, while particularly described with reference to transmitting data between a location downhole and the surface during testing installations, aspects of the present invention are not so limited. For example, some implementations of the present invention are applicable to transmission of data from the surface during drilling, in particular measurement-while-drilling (MWD) and logging-while-drilling (LWD). Additionally, some aspects of the present invention are applicable throughout the life of a wellbore including, but not limited to, during drilling, logging, drill stem testing, fracturing, stimulation, completion, cementing, and production.

Figure 1:
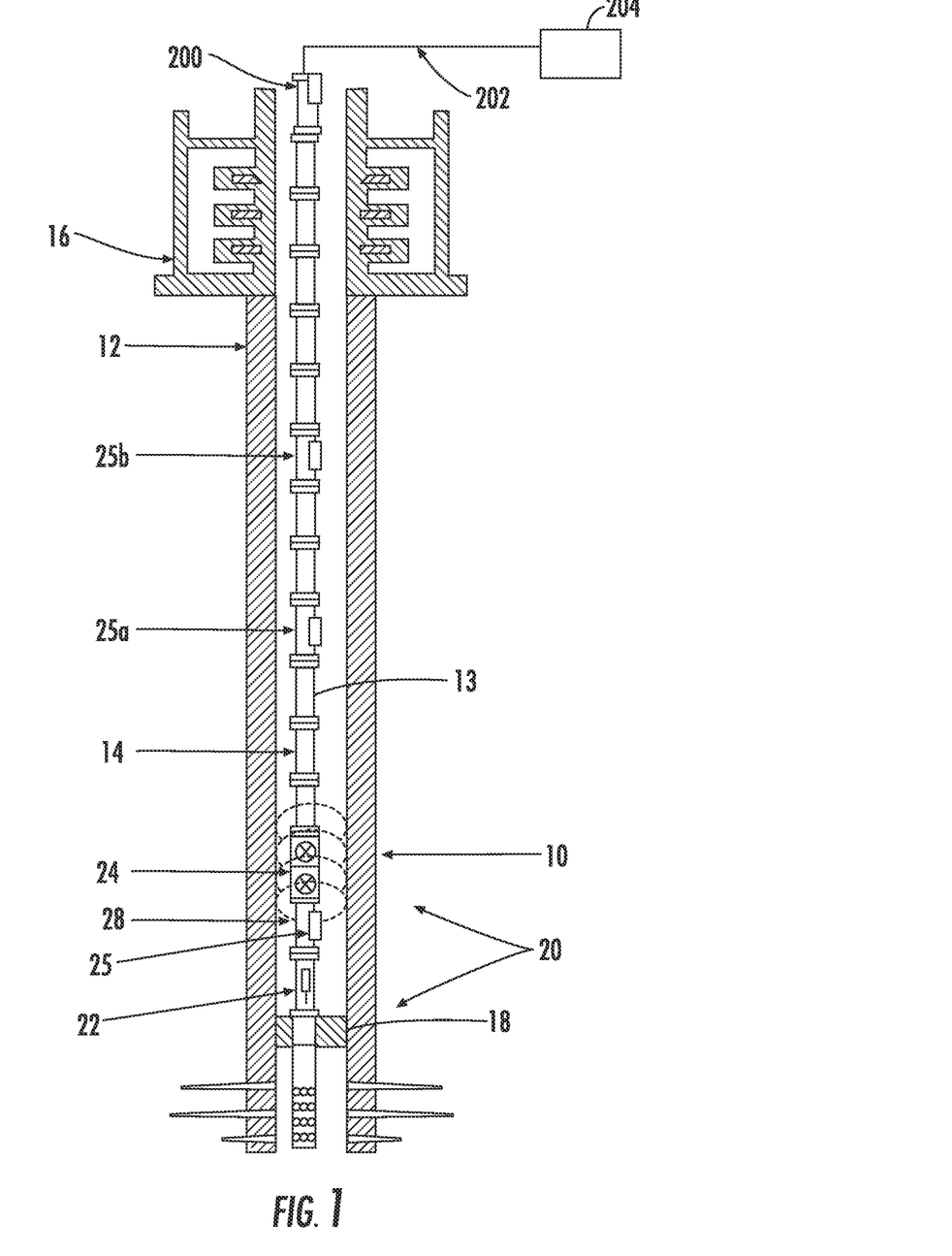
FIG. 1 shows a schematic view of an acoustic telemetry system for use with the present invention.

In particular, however, the present invention is applicable to testing installations such as are used in oil and gas wells or the like. FIG. 1 shows a schematic view of such an installation. Once the well has been drilled, the drilling apparatus is removed from the well and tests can be performed to determine the properties of the formation though which the well has been drilled. In the example of FIG. 1, the well 10 has been drilled, and lined with a steel casing 12 (cased hole) in the conventional manner, although similar systems can be used in uncased (open hole) environments. In order to test the formations, it is necessary to place testing apparatus in the well close to the regions to be tested, to be able to isolate sections or intervals of the well, and to convey fluids from the regions of interest to the surface. This is commonly done using an elastic media 13, such as a jointed tubular drill pipe 14 which extends from the well-head equipment 16 at the surface (or sea bed in subsea environments) down inside the well 10 to a zone of interest. Although the elastic media 13 will be described herein with respect to the drill pipe 14, it should be understood that the elastic media 13 can take other forms in accordance with the present invention, such as production tubing, a drill string, a tubular casing, or the like. The well-head equipment 16 can include blow-out preventers and connections for fluid, power and data communication.

A packer 18 is positioned on the drill pipe 14 and can be actuated to seal the borehole around the drill pipe 14 at the region of interest. Various pieces of downhole equipment 20 for testing and the like are connected to the drill pipe 14, either above or below the packer 18, such as a sampler 22, or a tester valve 24. The downhole equipment 20 may also be referred to herein as a "downhole tool." Other Examples of downhole equipment 20 can include:
  Further packers
  Circulation valves
  Downhole chokes
  Firing heads
  TCP (tubing conveyed perforator) gun drop subs
  Pressure gauges
  Downhole flow meters
  Downhole fluid analyzers
  Etc.

As shown in FIG. 1, the packer 18 can be located below the sampler 22 and the tester valve 24. The downhole equipment 20 is shown to be connected to a downhole modem 25 including an acoustic transceiver assembly 26 (shown in FIG. 3), which can be mounted in a gauge carrier 28 positioned between the sampler 22 and tester valve 24. The acoustic transceiver assembly 26, also known as an acoustic transducer, is an electro-mechanical device adapted to convert one type of energy or physical attribute to another, and may also transmit and receive, thereby allowing electrical signals received from downhole equipment 20 to be converted into acoustic signals for transmission to the surface, or for transmission to other locations of the drill pipe. In addition, the acoustic transceiver assembly 26 may operate to convert acoustic tool control signals from the surface into electrical signals for operating the downhole equipment 20. The term "data," as used herein, is meant to encompass control signals, tool status, sensed information and any variation thereof whether transmitted via digital or analog signals.

Figure 2:
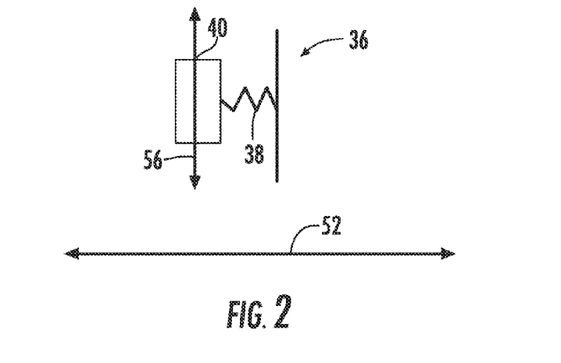
FIG. 2 is a schematic diagram of an oscillator constructed in accordance with the present invention as a mass-spring-dampener system.

FIG. 2 illustrates a schematic diagram of an oscillator 36, implementations of which are adapted for placement in or on downhole tools 20, generally, and as part of the acoustic transceiver assembly 26, in particular. The oscillator 36 is shown to include a transducer element 38, and a backing mass 40 calibrated to operate at a particular resonant frequency. As will be discussed in more detail below, the acoustic transceiver assembly 26 may also include at least one preloading spring 42, a housing 44 (see FIG. 3) and a blocking element 46.

The transducer element 38 can be constructed in a variety of manners suitable for converting electrical signals to acoustic signals and also for converting acoustic signals to electrical signals. Examples of suitable transducer elements include a piezoelectric element, a magnetostrictive element or the like. When the transducer element 38 is a piezoelectric element, such element is typically constructed of multiple layers of ceramic material which can be glued together, or held in compression, to thereby create a stack (not shown). The glue can be adapted to prevent the layers of the stack from moving side to side relative to each other as in one embodiment the layers must remain in proper alignment for satisfactory performance. However, due to the brittle nature of the typically ceramic, piezoelectric transducer element, and the harsh environment of oilfield technology, prior art methods of protecting the oscillator 36 may be unsatisfactory during transportation and installation of the downhole tools containing the oscillator 36. For example, during lateral movement or shock along an axis 56, the backing mass 40 appears to be mounted as a cantilever, and can generate important constraints on the transducer element 38. In one embodiment, the present invention will solve such problems by restraining the backing mass 40 in the event of lateral shocks at the surface, and freeing the backing mass 40 once the acoustic transceiver assembly 26 is at a certain depth downhole.

Figure 3:
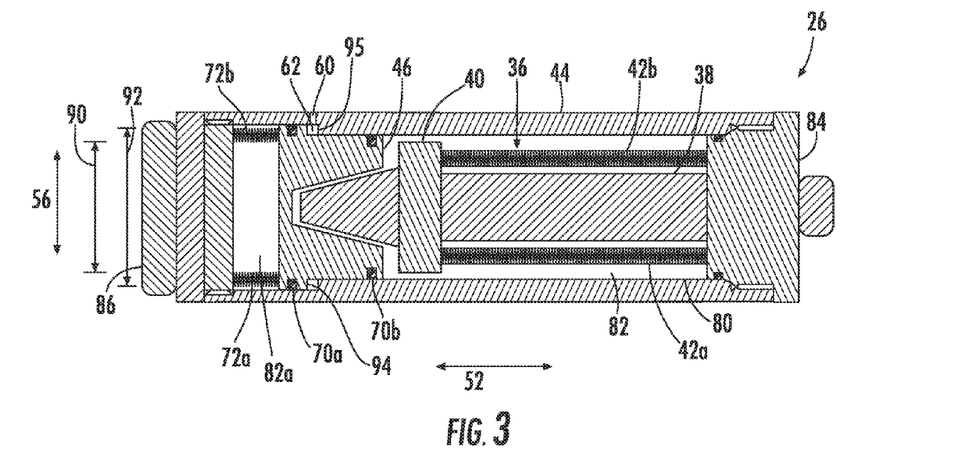
FIG. 3 illustrates an acoustic transceiver assembly constructed in accordance with a preferred implementation of the present invention.

FIG. 3 shows a schematic diagram of the acoustic transceiver assembly 26 in more detail. Although not shown in specific detail, the acoustic transceiver assembly 26 typically functions as both a transmitter and a receiver that share common or discrete circuitry or a single housing; although, in particular instances the acoustic transceiver assembly 26 may be adapted or used only as a transmitter or a receiver. The housing 44 of the acoustic transceiver assembly 26 may be adapted for placement in a wall, adjacent to a wall, or inside the tubing of downhole equipment 20. The backing mass 40 may be constructed of one or more of a number of different materials, including tungsten, steel, aluminum, stainless steel, depleted uranium, lead, or the like. The backing mass 40 is preferably made from high density material, such as tungsten alloys, steel, and the like and may be of any shape, such as, but not limited to, cylindrical, arcuate, rectangular, frusto-conical (as shown in FIG. 3) or square.

The housing 44 has a least one inner wall 80 to define a cavity 82. The housing 44 and cavity 82 have a first end 84 and a second end 86 defining the axis 52 of the acoustic transceiver assembly 26.

The oscillator 36 is provided in the cavity 82 defined by the inner wall 80 of the housing 44. As discussed above, generally, the oscillator 36 is provided with the transducer element 38, and the backing mass 40. In an alternative embodiment, however, the oscillator 36 may include at least one preloading spring 42 (two being shown in FIG. 3 and identified by reference numerals 42a and 42b). A first end of the preloading spring 42 is shown as being coupled to the backing mass 40, and a second end of the preloading spring 42 is shown as being coupled near the first end 84 of the cavity 82. It should be understood, however, that the preloading spring 42 may be provided in the interior of the transducer element 38. The backing mass 40 is preferably acoustically coupled to the transducer element 38 (i.e., rigidly connected such that the frequency of the backing mass 40 has an impact on the frequency of the transducer element 38), and the preloading spring(s) 42 may be adapted to provide a bias to the transducer element 38 so that the transducer element 38 can be maintained under compression.

The acoustic transceiver assembly 26 can further include a blocking element 46 positioned at one end of the oscillator 36 and adapted to restrain the backing mass 40 by, for example, engaging a portion of the backing mass 40 at a first pressure, e.g., atmospheric pressure, e.g., at the surface, and releasing the backing mass 40 at a second pressure, e.g., hydrostatic pressure, e.g., at a certain location down hole. In one version, the second pressure can be greater than the first pressure. As stated above, blocking element 46 is adapted to restrain the backing mass 40, which would be understood to mean that the blocking element 46 can be configured to, for example, either acting independently or in cooperation with additional features and/or elements described herein, be movable within housing 44 along axis 52 in response to changes in ambient pressure outside of the acoustic transceiver assembly 26. For example, in a preferred embodiment, the acoustic transceiver assembly 26 further includes an equalizing chamber 62 which is connected to the ambient pressure (e.g., outside of the housing 44) via at least one port hole 60, wherein the port hole 60 is positioned in, i.e., through, the housing 44. The at least one port hole 60 would be understood to be sized and/or shaped such that the ambient pressure surrounding the acoustic transceiver assembly 26 would pass through the at least one port hole 60 into the equalizing chamber 62. Further modifications to the at least one port hole 60 can, for example, include such features (not shown) as screens, filters, valves, extension tubing and the like.

The ambient pressure, which may range from below atmospheric to above hydrostatic pressure, enters the equalizing chamber 62 through the port hole 60 in the housing 44. The equalizing chamber 62 can be preferably sealed via a plurality of seals 70 (two being shown in FIG. 3 and identified by reference numeral 70a and 70b) so as to allow the remainder of the cavity 82 of the acoustic transceiver assembly 26 to be maintained at a separate pressure, such as atmospheric or vacuumed. If included, the plurality of seals 70 would be adapted to permit longitudinal movement of the blocking element 46 along axis 52 while maintaining separate pressures in cavity 82, blocking cavity 82a (discussed below) and equalizing chamber 62.

As would be understood, when the equalizing chamber 62 includes the plurality of seals 70, the cavity 82 of the acoustic transceiver assembly 26 would then be further subdivided to include the blocking cavity 82a. Thus, as shown in the example of FIG. 3, the cavity 82 can be defined as extending from near the first end 84 to the seal 70b. The blocking cavity 82a can be defined as extending from near the second end 86 to the seal 70a. The equalizing chamber 62 can be defined as extending between the seals 70a and 70b. The cavity 82 and the blocking cavity 82a can be at a predetermined, fixed pressure, e.g., atmospheric pressure or a vacuum, whereas the equalizing chamber 62 can be exposed to the ambient pressure via port hole 60. However, as would be understood in the art, other configurations of the cavity 82, blocking cavity 80a, equalizing chamber 62 and/or a plurality of seals 70 can be used to achieve the described functions without departing from the scope and intent of the present invention.

As stated above, the blocking element 46 is positioned inside the cavity 82 defined by the inner wall 80 of the housing 44 and adjacent to the oscillator 36. In one embodiment, which is shown in FIG. 3, the blocking element 46 can further be defined as including a first outside cross-sectional distance 90 and a second outside cross-sectional distance 92 wherein the first outside cross-sectional distance 90 is smaller than the second outside cross-sectional distance 92. As shown in FIG. 3, the first and second outside cross-sectional distances 90 and 92 cooperate to form a shoulder 94 which can be perpendicular to axis 52. As would be understood, the inner wall 80 can be configured to also include a shoulder 95 which can be adapted to receive the shoulder 94 of the blocking element 46. In one embodiment, the shoulder 94 can be configured such that the blocking element 46 is prevented from extending away from the second end 86 and towards the backing mass 40 so far as to impact and/or damage the oscillator 36. In another embodiment, the port hole 60 can be positioned such that it would not be blocked or otherwise obstructed by blocking element 46 when moved toward the oscillator 36. The shoulder 94 of the blocking element 46, and the corresponding shoulder 95 of the inner wall 80, when separated, can thereby form the equalizing chamber 62. However, as would be readily understood in the art, other configurations and/or shapes of the blocking element 46 and the corresponding inner wall 80 can be used, e.g., such as sloped, stepped and the like.

In another preferred embodiment, the port hole 60 is positioned such that when a second pressure higher than the pressure in the cavity 82 and blocking cavity 82a enters the equalizing chamber 62 via the at least one port hole 60, the resultant increase in pressure inside the equalizing chamber 62 operates to expand said chamber 62 and thereby force the blocking element 46 longitudinally along axis 52 toward the second end 86, thereby releasing the oscillator 36 and allowing it to move freely.

In this version, when the second pressure, preferably hydrostatic, which is higher than the pressure in the cavity 82 and blocking cavity 82a, enters the equalizing chamber 62 via the port hole 60, the resultant pressure within the equalizing chamber 62 increases and thereby exerts a force acting against the blocking element 46. In particular, the force acts to expand the equalizing chamber 62 to thereby push the blocking element 46 towards the second end 86 along the axis 52, i.e., the force acts to separate the backing mass 40 and the blocking element 46 to thereby release the backing mass 40 and allow it to move freely at the second pressure. Similarly, when a first pressure which is lower than or equal to the pressure in the cavity 82 and blocking cavity 82a enters the equalizing chamber 62, the blocking element 46 is allowed to move back towards the first end 84 along the axis 52 to thereby restrain a portion of the backing mass 40 to prevent movement at the first pressure.

As is described above, the equalizing chamber 62 is preferably sealed by a plurality of seal(s) 70. However, it should be understood that the equalizing chamber 62 can also be sealed via other means known in the art. Similarly, other methods can be used to permit the blocking element 46 to restrain the backing mass 40 at a first pressure and release the backing mass 40 at a second pressure, as are discussed below.

As shown in FIG. 3 and described above, the blocking element 46 can optionally be biased using a plurality of blocking springs 72 (two being shown in FIG. 3 and identified by reference numerals 72a and 72b) calibrated to push the blocking element 46 against the backing mass 40 at the first pressure, preferably atmospheric, thereby restraining the backing mass 40 from lateral movement at such first pressure. As the ambient pressure surrounding the acoustic transceiver assembly 26 increases, e.g., the acoustic transceiver assembly 26 is lowered downhole, the ambient pressure entering the equalizing chamber 62 likewise increases. The increased pressure allows the blocking element 46 to apply a greater force to the blocking springs 72, thereby releasing the backing mass 40 and allowing the backing mass 40 and oscillator 36 to freely vibrate.

While the blocking element 46 is shown to be of a shape to mate with the backing mass 40, it is to be understood that the blocking element 46 may be of any shape so as to prevent the oscillator 36 from lateral movement at a first pressure, and release the oscillator 36 at a second pressure. In particular, any of the aforementioned corresponding shapes can be used without departing from the scope and intent of the present invention.

In a preferred embodiment of the present invention, to make the acoustic transceiver assembly 26 compact, the backing mass 40 is advantageously made of a high-density alloy, such as tungsten carbide.

In order to increase the reliability of the transducer element 38, the radial motion of the various parts of the acoustic transceiver assembly 26 should remain as small as possible. Therefore, close tolerances are preferably used during the manufacturing of the components described therein.

Figure 4:
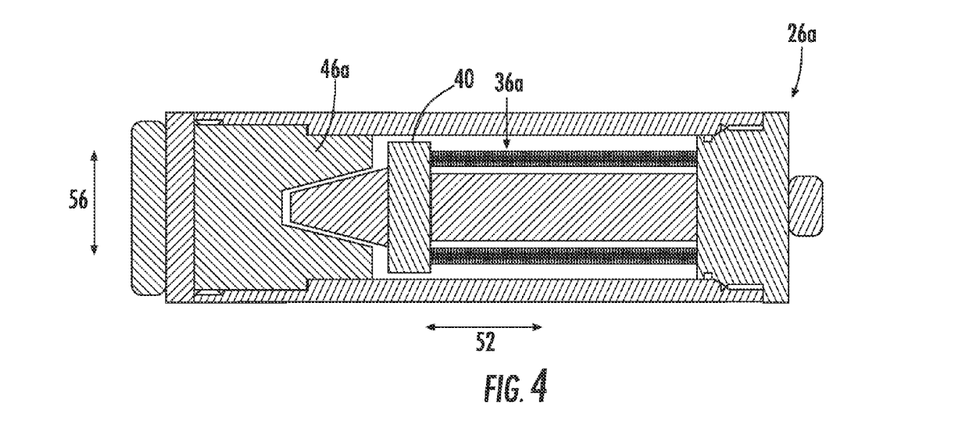
FIG. 4 illustrates schematic view of another version of an acoustic transceiver assembly in accordance with the present invention.

Referring now to FIG. 4, shown therein is an alternate embodiment of an acoustic transceiver assembly designated by reference numeral 26a. As shown therein, the acoustic transceiver assembly 26a is constructed without the blocking spring(s) 72, the blocking cavity 82a, the at least one port hole 60 and equalizing chamber 62, as well as the associated seal(s) 70, shown in FIG. 3. In this alternate embodiment, the acoustic transceiver assembly 26a includes the oscillator 36a and the adjacent blocking element 46a. As would be understood, this embodiment does not operate via the first and second pressures, and features associated therewith. Instead, this alternate embodiment achieves the above stated goals and/or functions by the use of closely machined tolerances between the blocking element 46a and backing mass 40a. That is, the blocking element 46a and backing mass 40a can be sized and shaped such that the blocking element 46a restricts or limits movement of the oscillator along axis 56 but allows movement, e.g., oscillation along axis 52. For example, such functionality can be achieved via closely machined tolerances of the relevant components during the manufacturing and/or assembly process. Other possible variations can include a telescoping arrangement, and/or a flexible substance (not shown) inserted between the blocking element 46a and the backing mass 40a.

Figure 5:
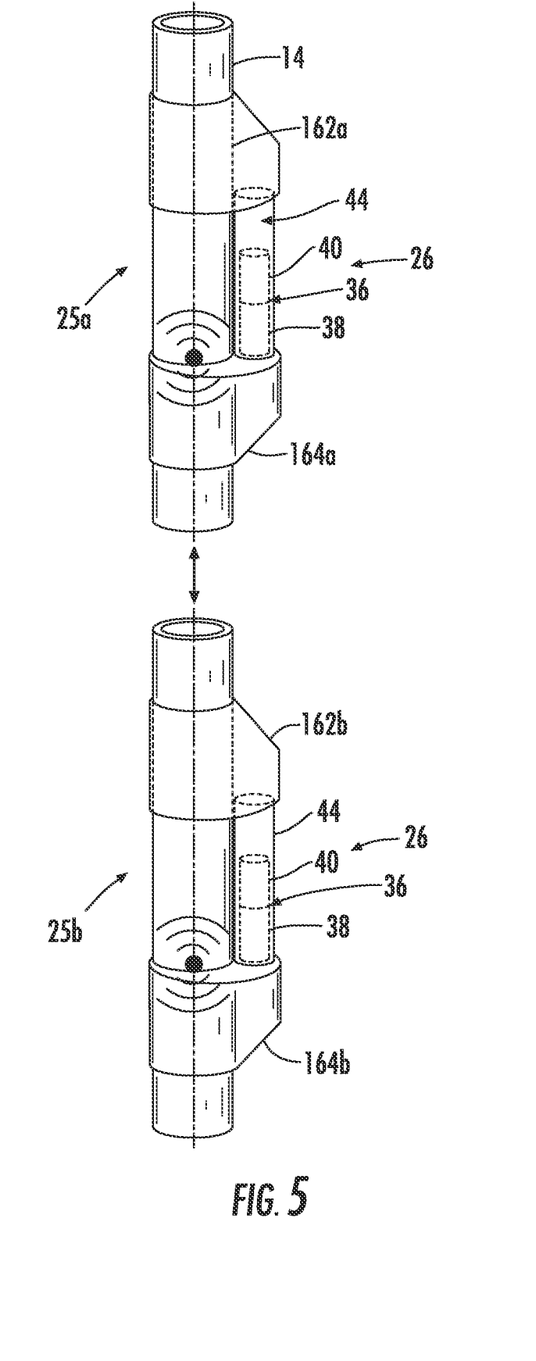
FIG. 5 is a partial schematic view of two downhole modems connected to a drill pipe and communicating with each other in accordance with the present invention.

Referring now to FIG. 5, shown therein is a section of the drill pipe 14 having multiple downhole modems 25 (designated by reference numerals 25a and 25b) mounted thereto and spatially disposed so as to transmit and/or receive acoustic signals there between via the drill pipe 14. It should be noted that the drill pipe 14 is an example of the elastic media 13 that transmits acoustic or stress signals. The downhole modems 25a and 25b are shown as being attached to the outside of the drill pipe 14 using a pair of clamps 162 and 164 (which are designated in FIG. 5 as 162a, 162b, 164a, and 164b). When actuated by a signal, such as a voltage potential initiated by a sensor, the downhole modem 25 which is mechanically mounted onto the drill pipe 14 imparts a stress wave which may also be now known as an acoustic wave into the drill pipe 14. Because metal drill pipe propagates stress waves, the downhole modems 25a and 25b including the acoustic transceiver assemblies 26 can be used to transmit the acoustic signals between each other, or to the surface. Furthermore, the downhole modems 25a and 25b including the acoustic transceiver assembly 26 can be used during all aspects of well site development and/or testing regardless of whether drilling is currently present. It should be noted that in lieu of the drill pipe 14, other appropriate tubular member(s) (elastic media 13) may be used, such as production tubing, and/or casing to convey the acoustic signals.

Figure 6:
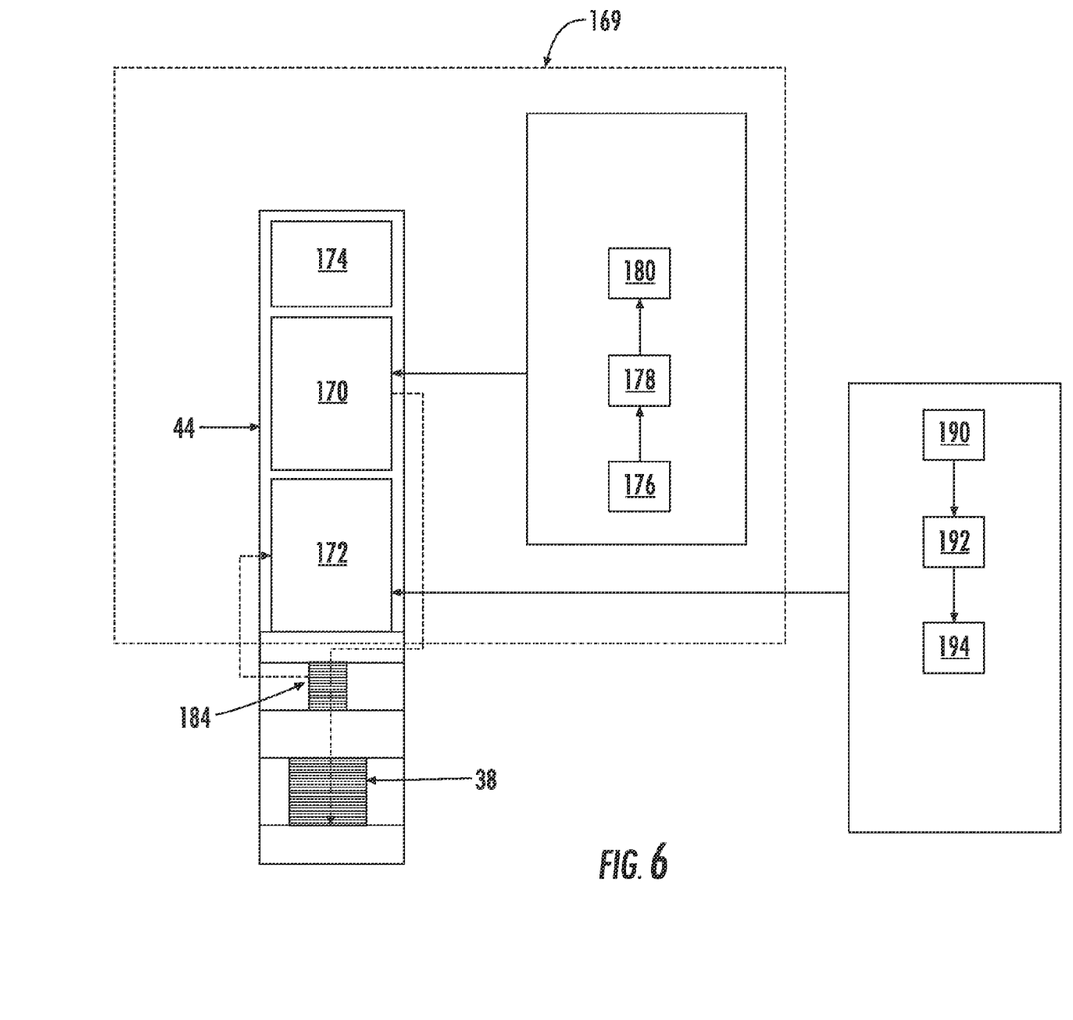
FIG. 6 is a partial block diagram of a modem constructed in accordance with the present invention.

Referring to FIG. 6, the downhole modems 25a and 25b include control electronics 169 including transmitter electronics 170 and receiver electronics 172. The transmitter electronics 170 and receiver electronics 172 may also be located in the housing 44 and power is provided by means of a battery, such as a lithium battery 174. Other types of power supply may also be used.

The transmitter electronics 170 are arranged to initially receive an electrical output signal from a sensor 176, for example from the downhole equipment 20 provided from an electrical or electro/mechanical interface. Such signals are typically digital signals which can be provided to a microcontroller 178 which modulates the signal in one of a number of known ways such as FM, PSK, QPSK, QAM, and the like. The resulting modulated signal is amplified by either a linear or non-linear amplifier 180 and transmitted to the transducer element 38 so as to generate an acoustic signal in the material of the drill pipe 14.

The acoustic signal that passes along the drill pipe 14 as a longitudinal and/or flexural wave comprises a carrier signal with an applied modulation of the data received from the sensors 176. The acoustic signal typically has, but is not limited to, a frequency in the range 1-10 kHz, and is configured to pass data at a rate of from about 1 bps to about 200 bps. The data rate is dependent upon conditions such as the noise level, carrier frequency, and the distance between the downhole modems 25a and 25b. A preferred embodiment of the present invention is directed to a combination of a short hop acoustic telemetry system for transmitting data between a hub located above the main packer 18 and a plurality of downhole equipment such as valves below and/or above said packer 18. Either one or both of the downhole modems 25a and 25b can be configured as a repeater. Then the data and/or control signals can be transmitted from the hub to a surface module either via a plurality of repeaters as acoustic signals or by converting into electromagnetic signals and transmitting straight to the top. The combination of a short hop acoustic with a plurality of repeaters and/or the use of the electromagnetic waves allows an improved data rate over existing systems. The system 10 may be designed to transmit data as high as 200 bps. Other advantages of the present system exist.

The receiver electronics 172 are arranged to receive the acoustic signal passing along the drill pipe 14 produced by the transmitter electronics 170 of another modem. The receiver electronics 172 are capable of converting the acoustic signal into an electric signal. In a preferred embodiment, the acoustic signal passing along the drill pipe 14 excites the transducer element 38 so as to generate an electric output signal (voltage); however, it is contemplated that the acoustic signal may excite an accelerometer 184 or an additional transducer element 38 so as to generate an electric output signal (voltage). This signal can be, for example, essentially an analog signal carrying digital information. The analog signal is applied to a signal conditioner 190, which operates to filter/condition the analog signal to be digitalized by an A/D (analog-to-digital) converter 192. The A/D converter 192 provides a digital signal which can be applied to a microcontroller 194. The microcontroller 194 is preferably adapted to demodulate the digital signal in order to recover the data provided by the sensor 176 connected to another modem, or provided by the surface. Although shown and described as separate microcontrollers 178 and 194, each microcontroller can alternatively be incorporated into a single microcontroller (not shown) performing both functions. The type of signal processing depends on the applied modulation (i.e. FM, PSK, QPSK, QAM, and the like).

The modem 25 can therefore operate to transmit acoustic data signals from the sensors in the downhole equipment 20 along the drill pipe 14. In this case, the electrical signals from the equipment 20 are applied to the transmitter electronics 170 (described above) which operate to generate the acoustic signal. The modem 25 can also operate to receive acoustic control signals to be applied to the downhole equipment 20. In this case, the acoustic signals are demodulated by the receiver electronics 172 (described above), which operate to generate the electric control signal that can be applied to the equipment 20.

In order to support acoustic signal transmission along the drill pipe 14 between the downhole location and the surface, a series of repeater modems 25a, 25b, etc. may be positioned along the drill pipe 14. These repeater modems 25a and 25b (see FIG. 1) can operate to receive an acoustic signal generated in the drill pipe 14 by a preceding modem 25 and to amplify and retransmit the signal for further propagation along the drill pipe 14. The number and spacing of the repeater modems 25a and 25b will depend on the particular installation selected, for example on the distance that the signal must travel. A typical spacing between the modems 25a and 25b is around 1,000 ft, but may be much more or much less in order to accommodate all possible testing tool configurations. When acting as a repeater, the acoustic signal is received and processed by the receiver electronics 172 and the output signal is provided to the microcontroller 194 of the transmitter electronics 170 and used to drive the transducer element 38 in the manner described above. Thus an acoustic signal can be passed between the surface and the downhole location in a series of short hops.

The role of a repeater modem, for example, 25a and 25b, is to detect an incoming signal, to decode it, to interpret it and to subsequently rebroadcast it if required. In some implementations, the repeater modem 25a or 25b does not decode the signal but merely amplifies the signal (and the noise). In this case the repeater modem 25a or 25b is acting as a simple signal booster.

Repeater modems 25a and 25b are positioned along the tubing/piping string 14. The repeater modem 25a or 25b will either listen continuously for any incoming signal or may listen from time to time.

The acoustic wireless signals, conveying commands or messages, propagate in the transmission medium (the drill pipe 14) in an omni-directional fashion, that is to say up and down. It is not necessary for the modem 25 to know whether the acoustic signal is coming from another repeater modem 25a or 25b above or below. The direction of the message is preferably embedded in the message itself. Each message contains several network addresses: the address of the transmitter electronics 170 (last and/or first transmitter) and the address of the destination modem 25 at least. Based on the addresses embedded in the messages, the repeater modems 25a or 25b will interpret the message and construct a new message with updated information regarding the transmitter electronics 170 and destination addresses. Messages will be transmitted from repeater modem to repeater modem and slightly modified to include new network addresses.

Referring again to FIG. 1, a surface modem 200 is provided at the well head 16 which provides a connection between the drill pipe 14 and a data cable or wireless connection 202 to a control system 204 that can receive data from the downhole equipment 20 and provide control signals for its operation.

In the embodiment of FIG. 1, the acoustic telemetry system 10 is used to provide communication between the surface and the downhole location. In another embodiment, acoustic telemetry can be used for communication between tools in multi-zone testing. In this case, two or more zones of the well are isolated by means of one or more packers 18. Test equipment 20 is located in each isolated zone and corresponding modems 25 are provided in each zone case. Operation of the modems 25 allows the equipment 20 in each zone to communicate with each other as well as the equipment in other zones as well as allowing communication from the surface with control and data signals in the manner described above.

References in the specification to "one embodiment", "an embodiment", "an example embodiment", etc. indicate that the embodiments described may include a particular feature, structure or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to effect such future, structure, or characteristic in connection with other embodiments whether or not explicitly described.

Embodiments of the present invention with respect to the microcontrollers 178 and 194, and the control system 204 may be embodied utilizing machine executable instructions provided or stored on one or more machine readable medium. A machine-readable medium includes any mechanism which provides, that is, stores and/or transmits, information accessible by the microcontrollers 178 and 194 or another machine, such as the control system 204 including one or more computer, network device, manufacturing tool, or the like or any device with a set of one or more processors, etc., or multiple devices having one or more processors that work together, etc. In an exemplary embodiment, a machine-readable medium includes volatile and/or non-volatile media for example read-only memory, random access memory, magnetic disk storage media, optical storage media, flash memory devices or the like.

Such machine executable instructions are utilized to cause a general or special purpose processor, multiple processors, or the like to perform methods or processes of the embodiments of the present invention.

It should be understood that the components of the inventions set forth above can be provided as unitary elements, or multiple elements which are connected and/or otherwise adapted to function together, unless specifically limited to a unitary structure in the claims. For example, although the backing mass 40 is depicted as a unitary element, the backing mass 40 could be comprised of multiple discrete elements which are connected together using any suitable assembly, such as a system of threads. As another example, although the housing 44 is depicted as a unitary element, it should be understood that the housing 44 could be constructed of different pieces and/or sleeves which were connected together utilizing any suitable technology.

From the above description it is clear that the present invention is well adapted to carry out the disclosed aspects, and to attain the advantages mentioned herein as well as those inherent in the present invention. While presently preferred implementations of the present invention have been described for purposes of disclosure, it will be understood that numerous changes may be made which readily suggest themselves to those skilled in the art and which are accomplished within the spirit of the present invention disclosed.

What is claimed is:

1. An acoustic transceiver assembly comprising:
   a housing having at least one inner wall defining a cavity, the cavity having a first end and a second end defining an axis of the acoustic transceiver assembly;
   an oscillator provided in the cavity, the oscillator comprising:
      a transducer element positioned at the first end of the cavity,
      a backing mass positioned adjacent the transducer element, wherein the transducer element is disposed between the backing mass and the first end of the cavity;
   a blocking element positioned adjacent the oscillator in the cavity, the blocking element being adapted to restrain a portion of the backing mass from lateral movement relative to the axis of the acoustic transceiver assembly, and to permit oscillations of the backing mass, wherein the blocking element restrains the backing mass at a first pressure and releases the backing mass at a second pressure to permit oscillations of the backing mass;
   at least one blocking spring biased against the blocking element; and
   an equalizing chamber having a port hole open to receiving the first pressure and/or the second pressure.

2. The acoustic transceiver assembly of claim 1, further comprising at least one seal for sealing off the equalizing chamber.

3. The acoustic transceiver assembly of claim 1, wherein the second pressure is higher than the first pressure.

4. The acoustic transceiver assembly of claim 1, wherein the first pressure is atmospheric pressure, and the second pressure is hydrostatic pressure.

5. The acoustic transceiver assembly of claim 1, wherein the blocking element is conical.

6. An acoustic transceiver assembly comprising:
   a housing having at least one inner wall defining a cavity, the cavity having a first end and a second end defining an axis of the acoustic transceiver assembly;
   an oscillator provided in the cavity, the oscillator comprising:
      a transducer element positioned at the first end of the cavity,
      a backing mass positioned adjacent the transducer element, wherein the transducer element is disposed between the backing mass and the first end of the cavity;
   a blocking element positioned adjacent the oscillator in the cavity, the blocking element being adapted to restrain a portion of the backing mass from lateral movement relative to the axis of the acoustic transceiver assembly, and to permit oscillations of the backing mass; and
   at least one preloading spring having a first end coupled to the backing mass and a second end coupled to the first end of the cavity.

7. A downhole tool comprising:
   a sensor for monitoring a downhole parameter; and
   an acoustic transceiver assembly in communication with the sensor, the acoustic transceiver assembly comprising:
      a housing having at least one inner wall defining a cavity, the cavity having a first end and a second end defining an axis of the acoustic transceiver assembly;
      an oscillator provided in the cavity, the oscillator comprising:
         a transducer element positioned at the first end of the cavity,
         a backing mass positioned adjacent the transducer element, and
         wherein the transducer element is disposed between the backing mass and the first end of the cavity; and
      a blocking element positioned adjacent the oscillator in the cavity, the blocking element being adapted to restrain a portion of the backing mass from lateral movement relative to the axis of the acoustic transceiver assembly, and to permit oscillations of the backing mass, wherein the blocking element restrains the backing mass at a first pressure and releases the backing mass at a second pressure to permit oscillations of the backing mass;
      at least one blocking spring biased against the blocking element; and
      an equalizing chamber having a port hole open to receiving the first pressure and/or the second pressure.

8. The downhole tool of claim 7, wherein the acoustic transceiver assembly further comprises at least one seal for sealing off the equalizing chamber.

9. The downhole tool of claim 7, wherein the second pressure is higher than the first pressure.

10. The downhole tool of claim 7, wherein the first pressure is atmospheric pressure, and the second pressure is hydrostatic pressure.

11. The downhole tool of claim 7, wherein the blocking element of the acoustic transceiver assembly is conical.

12. A downhole tool comprising:
a sensor for monitoring a downhole parameter; and
an acoustic transceiver assembly in communication with the sensor, the acoustic transceiver assembly comprising:
   a housing having at least one inner wall defining a cavity, the cavity having a first end and a second end defining an axis of the acoustic transceiver assembly;
   an oscillator provided in the cavity, the oscillator comprising:
      a transducer element positioned at the first end of the cavity,
      a backing mass positioned adjacent the transducer element, wherein the transducer element is disposed between the backing mass and the first end of the cavity;
   a blocking element positioned adjacent the oscillator in the cavity, the blocking element being adapted to restrain a portion of the backing mass from lateral movement relative to the axis of the acoustic transceiver assembly, and to permit oscillations of the backing mass; and
   at least one preloading spring having a first end coupled to the backing mass and a second end coupled to the first end of the cavity.

13. An acoustic transceiver assembly comprising:
a housing having at least one inner wall defining a cavity, the cavity having a first end and a second end defining an axis of the acoustic transceiver assembly;
an oscillator provided in the cavity, the oscillator comprising:
   a piezoelectric element positioned at the first end of the cavity,
   a backing mass positioned adjacent the piezoelectric element, and
   wherein the piezoelectric element is disposed between the backing mass and the first end of the cavity;
a blocking element positioned adjacent the oscillator in the cavity, the blocking element being adapted to restrain a portion of the backing mass from lateral movement relative to the axis of the acoustic transceiver assembly, and to permit oscillations of the backing mass, wherein the blocking element restrains the backing mass at a first pressure and releases the backing mass at a second pressure to permit oscillations of the backing mass
at least one blocking spring biased against the blocking element; and
an equalizing chamber having a port hole open to receiving the first pressure and/or the second pressure.

14. The acoustic transceiver assembly of claim 13, further comprising at least one seal for sealing off the equalizing chamber.

15. The acoustic transceiver assembly of claim 13, wherein the second pressure is higher than the first pressure.

16. The acoustic transceiver assembly of claim 13, wherein the first pressure is atmospheric pressure, and the second pressure is hydrostatic pressure.

17. The acoustic transceiver assembly of claim 13, wherein the blocking element is conical.

18. An acoustic transceiver assembly comprising:
a housing having at least one inner wall defining a cavity, the cavity having a first end and a second end defining an axis of the acoustic transceiver assembly;
an oscillator provided in the cavity, the oscillator comprising:
   a piezoelectric element positioned at the first end of the cavity,
   a backing mass positioned adjacent the piezoelectric element, and
   wherein the piezoelectric element is disposed between the backing mass and the first end of the cavity;
a blocking element positioned adjacent the oscillator in the cavity, the blocking element being adapted to restrain a portion of the backing mass from lateral movement relative to the axis of the acoustic transceiver assembly, and to permit oscillations of the backing mass; and
at least one preloading spring having a first end coupled to the backing mass and a second end coupled to the first end of the cavity.

19. A method for making an acoustic transceiver assembly for introducing acoustic signals into an elastic media positioned in a well bore, comprising the steps of:
forming an oscillator by acoustically coupling a backing mass to a transducer element;
suspending the oscillator in a housing with a blocking element positioned adjacent to the backing mass, wherein the blocking element restrains the backing mass at a first pressure and releases the backing mass at a second pressure;
forming an equalizing chamber between the blocking element and the housing; and
forming at least one port hole in the equalizing chamber and through the housing, wherein the at least one port hole is adapted to receive the first and/or second pressures.

20. The method of claim 19 further including the step of forming at least one seal for sealing off the equalizing chamber.

21. The method of claim 19 wherein the blocking element is conical.

* * * * *

UNITED STATES PATENT AND TRADEMARK OFFICE
CERTIFICATE OF CORRECTION

| | | |
|---|---|---|
| PATENT NO. | : 8,570,832 B2 | Page 1 of 1 |
| APPLICATION NO. | : 12/644049 | |
| DATED | : October 29, 2013 | |
| INVENTOR(S) | : Christophe Rayssiguier et al. | |

It is certified that error appears in the above-identified patent and that said Letters Patent is hereby corrected as shown below:

On the Title page, item 54 and in the Specification, Column 1, the title should be:

Acoustic Transceiver Assembly with Blocking Element

Signed and Sealed this
Eighteenth Day of February, 2014

Michelle K. Lee
*Deputy Director of the United States Patent and Trademark Office*